Nov. 4, 1947.  R. L. FITCH  2,430,167
AUTOMATIC MAGNETIC INSPECTION APPARATUS
Filed July 5, 1943  4 Sheets-Sheet 1

INVENTOR.
Raymond L. Fitch;
BY
ATTORNEY.

Nov. 4, 1947.  R. L. FITCH  2,430,167
AUTOMATIC MAGNETIC INSPECTION APPARATUS
Filed July 5, 1943  4 Sheets-Sheet 4

INVENTOR.
Raymond L. Fitch,
BY
Robert N. Fulwider
ATTORNEY.

Patented Nov. 4, 1947

2,430,167

UNITED STATES PATENT OFFICE 2,430,167

AUTOMATIC MAGNETIC INSPECTION APPARATUS

Raymond L. Fitch, Pacific Palisades, Calif.

Application July 5, 1943, Serial No. 493,568

10 Claims. (Cl. 175—183)

My invention relates generally to magnetic inspection apparatus, and more particularly to apparatus which is automatic in its operation and which thereby substantially eliminates the human element in the magnetic inspection of metals.

In order to secure thoroughly satisfactory results in the operation of magnetic inspection apparatus, it is necessary that the article to be inspected be adequately sprayed with the inspection medium, and then magnetized at the instant the flow of the inspection medium ceases, and before any appreciable drainage thereof can take place. In my prior Patent No. 2,277,431, issued March 24, 1942, I have illustrated a manually-operated inspection machine which has proved very satisfactory, but which, as do all manually-operated machines, depends upon the skill of the operator for the excellence of its results.

The major object of this present invention is to provide magnetic inspection apparatus which substantially eliminates possible errors in judgment of the operator, since the operator merely initiates the action of the machine and the complete cycle of operations is then carried on automatically. As previously mentioned, it is quite important that the piece being inspected be magnetized immediately after the flooding ceases, and by accomplishing this timing automatically, the apparatus of my invention eliminates all human errors in this part of the cycle.

Another object of my invention is to provide magnetic inspection apparatus in which the flow of the inspection medium is uniform across the whole span of the work being inspected, it being possible to instantly interrupt the entire flow as desired.

For consistency of results, it is necessary that the magnetizing time be accurately adjusted and be uniformly applied; and it is an object of my invention to provide apparatus which will do this automatically.

It is a further object of my invention to provide a novel spring-loaded headstock which insures adequate support of the workpiece with a minimum of effort on the part of the operator. In conjunction with the spring-loaded headstock, I also provide an adjustable tailstock which can be locked quickly and easily in a minimum of time.

These and other objects and advantages of my invention will become apparent from the following description of a preferred form thereof, and from the accompanying drawings, in which:

Fig. 7 is a front elevational view, partly in section of the spring-loaded headstock;

Fig. 8 is a vertical end section of the headstock taken on the line 8—8 of Fig. 7;

Fig. 9 is a top plan view of the headstock, partially in section;

Figure 1:
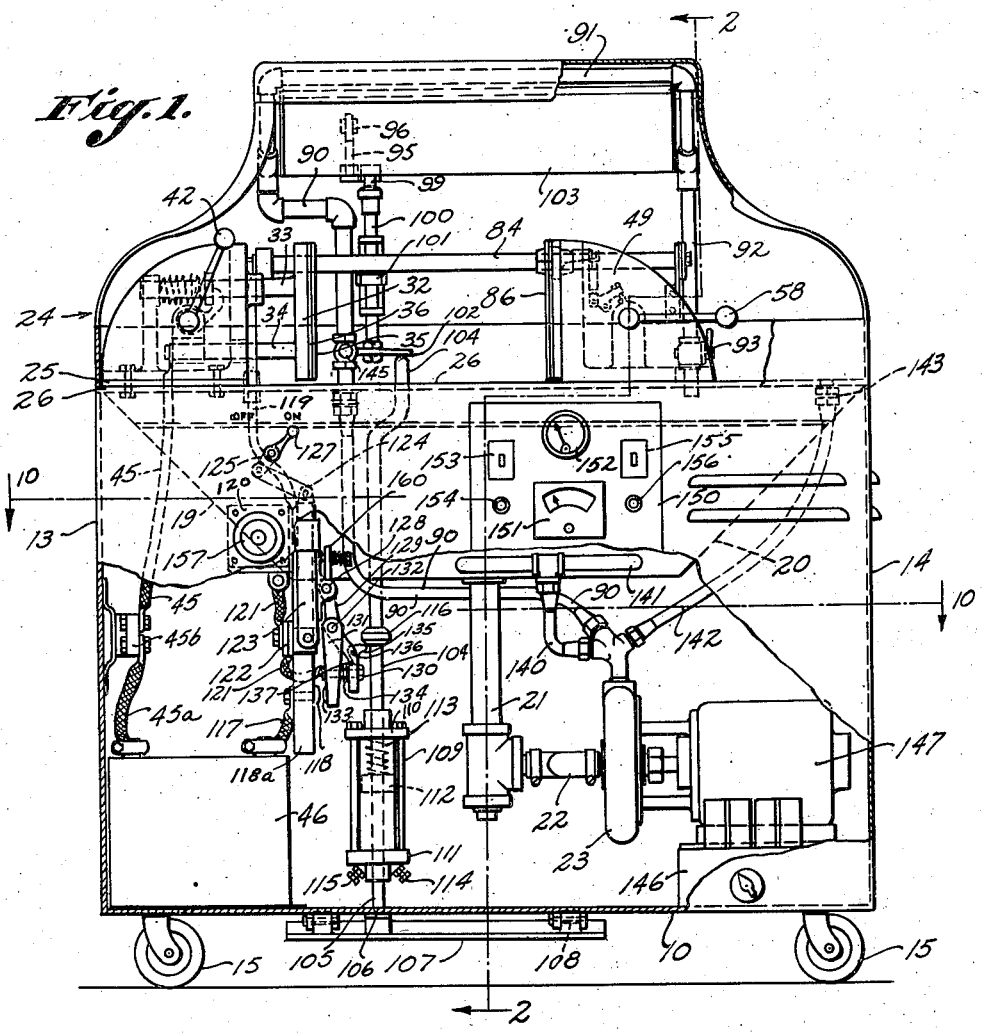
Fig. 1 is a front elevational view of a preferred form of my apparatus shown with the housing partially broken away.
Figure 2:
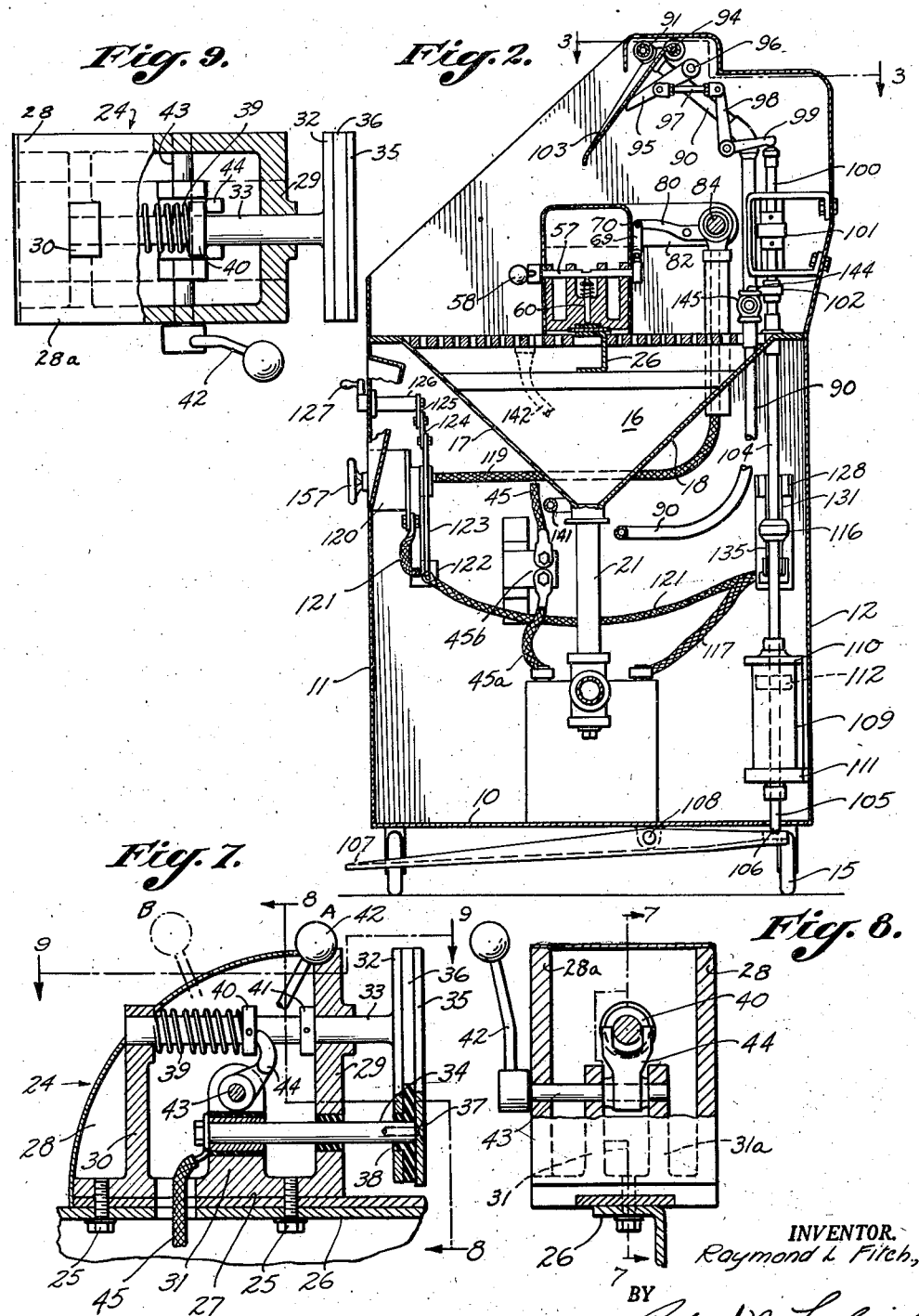
Fig. 2 is a vertical section taken along the line 2—2 of Fig. 1.
Figure 3:
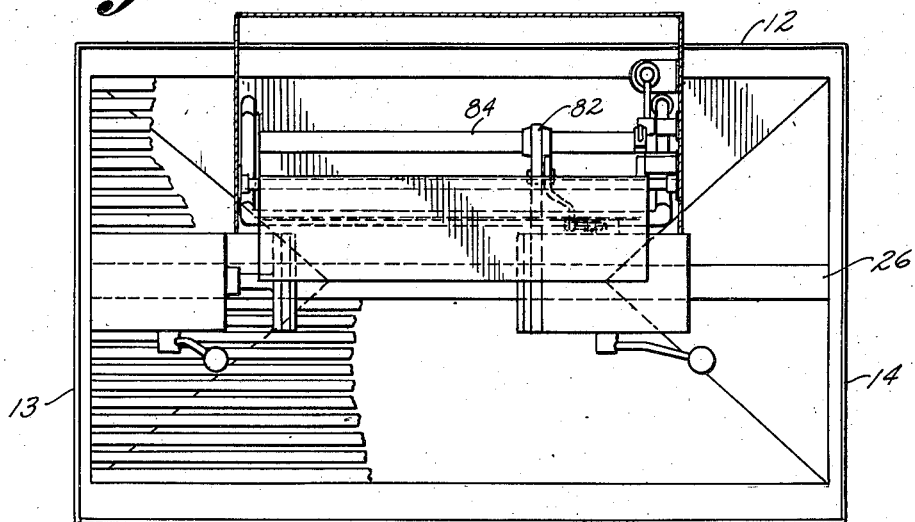
Fig. 3 is a top plan view of the machine.

Referring now to the drawings, and particularly to Figs. 1 and 2 thereof, the numeral 10 indicates the base of a cabinet which includes front and rear panels 11 and 12 and vertical side walls 13 and 14, the cabinet being preferably mounted on casters 15 so that it can be moved about without undue effort. Disposed in the upper portion of the cabinet is a sump 16 comprising sloping front and rear walls 17 and 18, and sloping end walls 19 and 20, respectively, the bottom of the sump having a drain pipe 21 connected thereto. The drain pipe 21 feeds by means of a horizontal connecting pipe 22 to a pump 23 whose function will be discussed more in detail later.

Suitably supported above the sump 16 is a channel iron 26 which extends across the entire width of the machine, and serves as a support or base for the parts which hold the piece to be inspected in a horizontal position by adjustable contact plates. Because the base of one of these clamping devices is stationary, I will refer to it as the headstock, while the other clamping device which is movable along the channel 26 will be referred to herein as the tailstock.

The headstock is indicated generally by the numeral 24 and as seen best in Fig. 1, it is preferably located at the left end of the machine, and has its body portion fastened to the channel iron 26 by suitable means, such as bolts 25. The body portion of the headstock comprises a base 27, front and rear upstanding webs 28 and 28a, end walls 29 and 30, respectively, and centrally-disposed bearing posts 31 and 31a. While the body portion of the headstock is fixed, the clamping head 32 which is carried by upper and lower horizontal supporting bars 33 and 34, has a limited horizontal movement. The clamping head 32 carries a copper or other electrical conduction contact plate 35 suitably insulated from the head 32 by a layer of fiber or other suitable insulating material 36. The contact plate 35 is, however, electrically connected to the lower supporting bar 34 by means of a screw 37 which also serves to additionally support the plate on the clamping head 32, it being noted that the head 32 is insulated from its lower supporting bar 35 by a nonconducting bushing 38.

The upper horizontal bar 33 is slideably mounted in end walls 29 and 30 of the headstock, and is normally urged outwardly (to the right in Fig. 1) by a spring 39 which surrounds the inner end of the bar 33 and bears against a collar 40 which is integral with the bar 33. A second collar 41 is fastened to the bar 33, and is adapted to engage the rear face of the forward wall 29 to limit the forward movement of the clamping head. The clamping head is adapted to be retracted by movement of a lever 42 from the position marked "A" in Fig. 7 to the position marked "B" in said figure. The lever 42 is keyed to a horizontal shaft 43 which is rotatably mounted in posts 31 and 32 and carries a yoke 44 adapted to engage the collar 40 on the bar 33, and move the same inwardly against the action of the spring 39. Suitable locking means (not shown) may be provided if desired for holding the lever 42 in position "B," but normally this is not necessary. The lower supporting bar 34 is slidable through wall 29 from which it is insulated, and its rear end is connected to a battery 46 by means of cables 45 and 45a which are joined through a junction box or small bus bar 45b.

Figure 4:
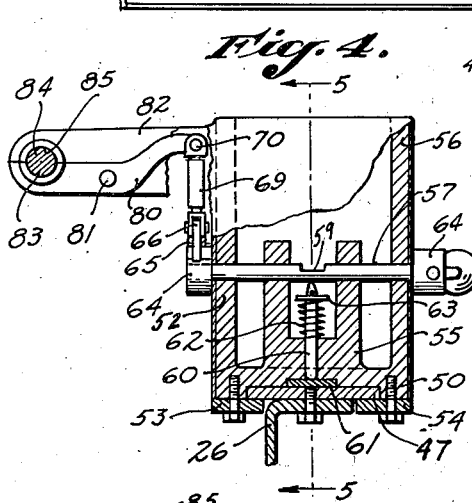
Fig. 4 is an end view partly in section of the movable tailstock, and taken as indicated by the line 4—4 of Fig. 5.
Figure 5:
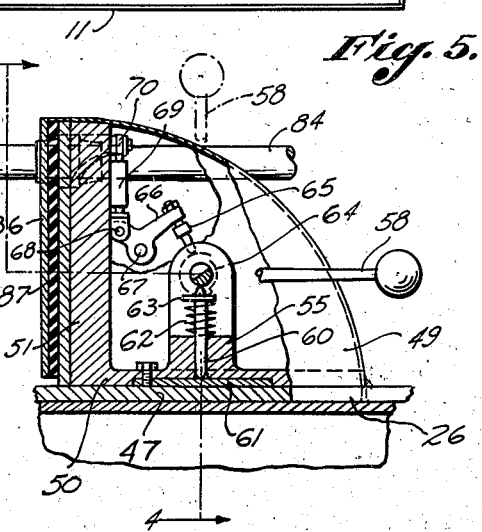
Fig. 5 is a front elevational view, partially in section, of the tailstock taken as indicated on the line 5—5 of Fig. 4.
Figure 6:
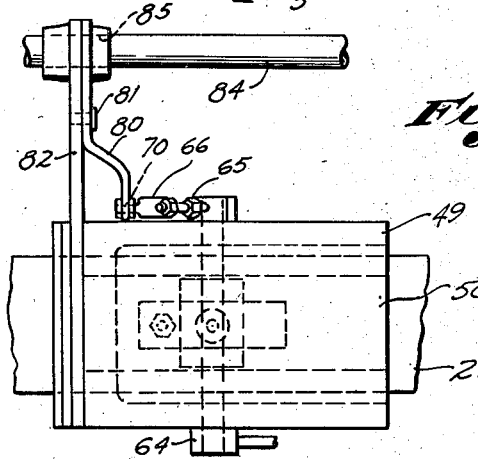
Fig. 6 is a top plan view of the tail stock assembly.
Figure 10:
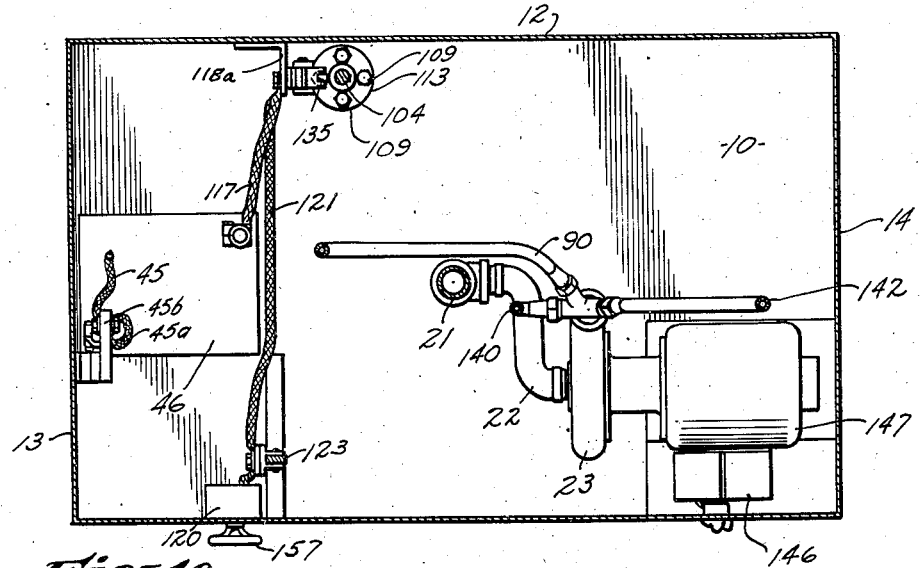
Fig. 10 is a horizontal section taken on the line 10—10 of Fig. 1.

As seen best in Figs. 4 and 5, the channel iron 26 which extends across the central portion of the cabinet adjacent to the upper end thereof has a track plate 47 securely bolted thereto, the track 47 being somewhat wider than the channel 26, and overhanging its sides. A movable tailstock 49 comprising a base portion 50 and an upstanding forward wall 51 is slideably mounted on the track plate 47 and lockable thereto.

The bottom of the base portion 50 is recessed or grooved to accommodate the track plate 47 and is then counter-grooved and provided with a longitudinal bearing plate 61, which rests on the track plate 47. Cover plates 53 and 54 are bolted to the bottom of the base 50 in a position underlapping the lower face of the track 47, but not engaging the channel 26. It will thus be seen that the tailstock is securely held against vertical movement by the cover plates 53 and 54 which engage the bottom of the track 47, and the bearing plate 61 which slides on the top thereof. The tailstock is, however, free to move lengthwise along the track 47 unless clamped thereto as now to be described.

The tailstock 49 is provided with front and rear web plates 52 and 56, between which is a boss 55 having spaced vertical ears. A horizontal shaft 57 provided with an operating arm 58 fastened to one end thereof is journaled in the boss ears and the webs as seen best in Fig. 4. The center portion of the shaft 57 is partially cut away and rounded to provide an eccentric camming surface 59 which engages the upper end of a vertical plunger 60 which is slidable through a vertical bore in the boss 55, and bears against the upper face of bearing plate 61. A spring 62 surrounds the plunger 60 with one end bearing against the upper face of the boss 55 and the upper end bearing against a collar 63 fastened to the plunger 60, whereby the plunger is normally urged upwardly out of engagement with the bearing plate 61.

However, when the crank arm 58 is rotated from the vertical position shown in broken lines in Fig. 5 to the horizontal position shown in full lines in said figure, the eccentric portion 59 of the shaft 57 is rotated to throw its high side against the plunger 60 and force it down against the bearing plate 61. This securely clamps the track plate 47 between the bearing plate 61 and the cover plates 53 and 54 so that the tailstock is locked in position and can stand considerable longitudinal force. It will be apparent of course that by raising the crank arm 58 to the vertical position the plunger 60 will be released and the tailstock may be readily slid along the track plate 47 to any convenient position.

The shaft 57 carries a cam 64 on its rear end which is engaged by a cam follower 65 carried on the end of a crank arm 66 pivoted on a horizontal pin 67. The other end of the crank arm 66 is pivotally connected at 68 to a substantially vertical link 69 made of insulating material which in turn is pivotally connected at 70 to the forward end of a lever 80 pivotally mounted at 81 on an extending arm or bracket 82 carried on the rear side of the tailstock. The rear end of the arm 80 is provided with a semi-cylindrical clamping face 83 adapted to engage a horizontal bus bar 84 which extends along the rear of the machine. The bracket 82 is provided with a similar semi-cylindrical clamping face 85 immediately above the face 83 and adapted to cooperate therewith so that the two faces together will securely clamp the bus bar 84 when the link 69 is pulled down. It will be apparent that rotation of the crank arm 58 with consequent rotation of the shaft 57 and cam 64 will bring the high side of the cam 64 against the follower 65 which will raise the crank arm 66, thus pulling the link 69 downwardly and raising face 83 upwardly into tight engagement with the bus bar 84. It is thus seen that the tailstock cannot only be securely clamped to its track 47 but can also be securely clamped to the bus bar 84 which extends the full length of the apparatus.

In the operation of the work-holding means, the tailstock is moved along the track until the distance between it and the headstock is slightly less than the length of the workpiece. The tailstock is then clamped in this position by rotation of the crank arm 58 as previously described which rotation also causes contact to be established between the clamping face 83, carried by tailstock, and the bus bar 84. The contact plate of the tailstock is indicated by the numeral 86 and is electrically connected to the bracket 82 but is suitably insulated from the balance of the tailstock by an insulating sheet 87. The headstock lever 42 is moved to retract its contact plate 35, the workpiece is placed in position between the two contact plates, and the lever 42 is released allowing the spring 39 to urge the contact plate 35 firmly against the end of the workpiece and to hold the same in fixed position between the contact plates of the headstock and the tailstock, so that it may be flooded with iron oxide paste or such other material as may be used as an inspection medium. By spring loading the headstock contact face, I provide a simple and effective means of adjusting the workpiece in the machine, and exerting sufficient pressure thereon to hold it securely in place for testing purposes.

As previously mentioned, one of the features of my invention is the provision of effective means for completely flooding the entire workpiece with the inspection medium and then quickly shutting off the flow just before the workpiece is magnetized. In the preferred form of my invention shown herein, I connect the outlet of the pump 23 through a pipe 90 to a horizontal header pipe 91 disposed above the machine and somewhat to the rear of the central portion thereof. The header 91 is provided with a longitudinal slot or a series of openings to allow the inspection medium to flow out of the header and fall downwardly. To easily control the pressure in the header and therefore the rate of flow of the fluid through the apertures therein, I prefer to connect the open end of the header to a vertical pipe 92 which is provided with a valve or gate 93 at its lower end, so that by varying the valve opening, the back pressure on the header is varied, and the amount of fluid discharged therefrom is therefore varied. It will be understood, of course, that the inspection medium falls into the sump 16 and is recirculated by the pump.

A baffle plate 103 is pivotally mounted at its upper edge on a shaft 94 adjacent the header 91, so that it can be swung into the path of the liquid flowing from the header, to direct the liquid onto the work to be tested so as to completely and uniformly flood the same. When the baffle 103 is retracted, as by gravity in the form shown, the inspection medium will flow down behind the work and will not interfere with the testing operations. As a simple and convenient means of operating the baffle 93, I provide an arm 95 pivotally mounted at 96 and adjusted so that its forward end will engage the under side of the baffle. The arm 95 is pivotally connected by means of a link 97 to an arm 98 of a bell crank whose other arm 99 is operated by the upper end of a vertical rod 100 which is adapted to move vertically in a bracket 101 and is provided with a horizontal arm 102 on its lower end. The outer end of the arm 102 engages the upper end of a vertical push rod 104 whose lower end 105 is operated by the rear end 106 of a foot treadle whose forward end is indicated by the numeral 107 and which is pivoted at 108 to the lower portion of the machine.

The lower portion of the push rod 104 passes through a cylinder 109 provided with upper and lower heads 110 and 111, respectively. A piston head 112 is fast to that portion of the push rod which extends through the cylinder 109, and a spring 113 surrounds the push rod between piston 112, and cylinder head 110 to normally urge the piston head and its associated push rod downwardly. The cylinder 109 is provided at its lower end with a needle valve 114 and a check valve 115 so adjusted that when the piston 112 is raised, air will flow freely into the cylinder through the check valve 115, and when the piston is lowered, the air will be slowly expelled from the cylinder through the needle valve 114, thus cushioning the downward movement of the piston and delaying its travel. It will be obvious that by varying the setting of the needle valve 114, the rate of return travel of the piston 112, and consequently the push rod 104, can be governed within very accurate limits.

From the foregoing, it will be seen that when the forward end 107 of the foot treadle is depressed, its rear end 106 will force the push rod assembly upwardly, thus moving the vertical rod 100 upwardly, which rotates the crank arms 99 and 98 to swing the baffle-operating arm 95 forwardly and consequently move the baffle 103 forwardly to a position where the inspection medium will cascade down over the baffle and onto the work being inspected. So long as the foot treadle is retained in the depressed position, the inspection medium will continue to flood the workpiece. When it is desired to magnetize the workpiece, the foot is removed from the treadle which allows the push rod with its related mechanism to move downwardly by the force of gravity and the spring 113, thus allowing the baffle 103 to swing downwardly to its normal position where the inspection medium no longer floods the work. This return movement of the push rod 104 whose rate of travel is governed by the setting of the needle valve 114 completes the magnetizing circuit through the workpiece for the required time and then disconnects the circuit after the work has been sufficiently magnetized, the adjustment of the parts being such that the current starts flowing the instant the inspection medium ceases to flow over the workpiece.

Figure 11:
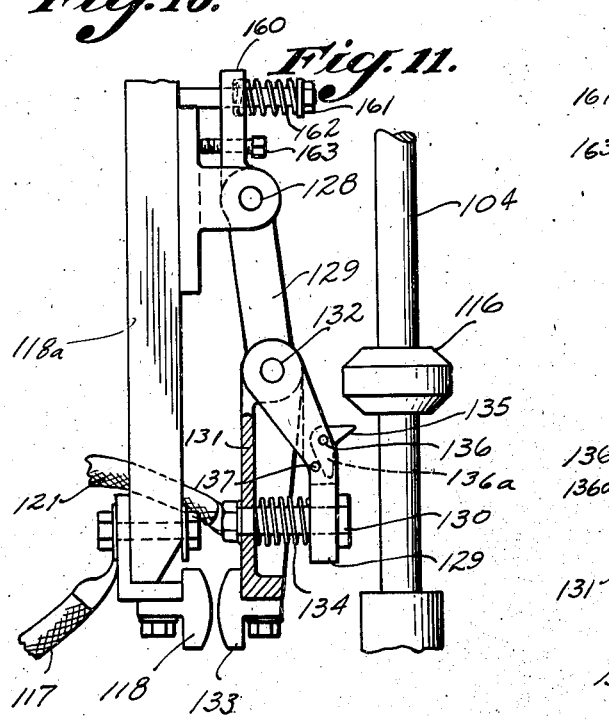
Fig. 11 is an enlarged detail partly in section of the switch mechanism.
Figure 12:
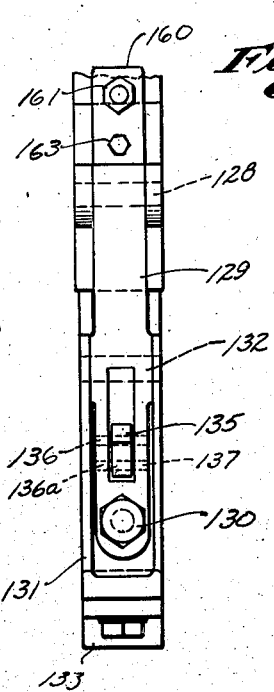
Fig. 12 is an end view of the mechanism shown in Fig. 11.

In the preferred form of my invention illustrated herein, I control the magnetizing circuit by means of a cam 116 fastened on the push rod 104 above the cylinder 109. One terminal of the battery 46 is connected by a cable 117 to a stationary switch contact 118 carried on a bracket 118a. The other battery terminal as previously mentioned is connected through cables 45a and 45 through the headstock contact plate to the work being tested, which completes the circuit between the headstock contact plate 35 and the tailstock contact plate 36 which is connected through the bracket 82 to the bus bar 84. A cable 119 leads from the bus bar 84 to one side of a rheostat 120, preferably of the carbon pile type, and from the rheostat through a cable 121 to a bus bar 122. A knife switch 123 pivoted on the bus bar 122 and adapted to be operated by a pair of toggle levers 124 and 125, the latter of which is connected through a shaft 126 to handle 127, is adapted to short circuit the rheostat 120 when it is desired to pass the entire available current from the battery through the work being inspected; however, for smaller pieces where a less magnetizing current is needed, the knife switch is thrown to the "off" position, so that the magnetizing current passes through the rheostat and is controlled by the setting thereof. The bracket 118a has an ear 128 fastened thereon to which is pivotally connected a downwardly-extending arm 129 that is preferably curved outwardly as seen best in Figs. 1 and 11 and is provided with a horizontally-extending bolt 130 on its lower end. A contact arm 131 is pivoted at its upper end by pin 132 to the mid-portion of arm 129, the lower end of the contact arm 131 carrying a contact face 133 adapted to engage the contact face 118. The arm 131 is bored to receive the bolt 130 and helical spring 134 urges the arms 131 and 129 apart. The contacts 118 and 133 are held normally open by a helical spring 162 mounted between the upper end 160 of arm 129 and the head of a bolt 161 which extends through the arm portion 161 and is anchored in bracket 118a. A small bell crank having a horizontal arm 135 is pivoted at 136 on the arm 129 just above the bolt 130 and has its depending arm 136a engageable with a stop 137 provided on the arm 129 to limit the movement of the crank. The horizontal crank arm 135 is disposed adjacent the push rod 104 and is in the path of the cam 116 so as to be engaged thereby during its vertical movement.

When the push rod 104 and its cam 116 are moved upwardly, the cam 116 will slide by the crank arm 135 which is freely movable in that direction on its pivot 136. However, when the cam 116 returns, its lower face will engage the crank arm 135 and rotate the crank so that the depending arm 136a engages the stop 137 which will cause the arms 129 and 131 to swing towards the fixed contact 118 (to the left in Fig. 1). The movable contact 113 thereupon engages the fixed contact 118 to close the magnetizing circuit in the manner previously described, and further downward movement of the cam 116 compresses the spring 134 and causes the arm 129 to move toward the arm 131 by virtue of the pivot connection 132. This increases the pressure between the contact 118 and 133 and displaces the arm 131 slightly in a vertical direction, thus giving a wiping action to the contacts and minimizing the effects of pitting. The speed of the push rod 104 is so adjusted by adjustment of the needle valve 114 that the contacts 118 and 133 are kept in engagement just the proper length of time to fully magnetize the workpiece, and when this interval of time has expired, the cam 116 will have passed below and become disengaged with the crank arm 135, permitting the arms 129 and 131 to return to their normal position, breaking the magnetizing circuit.

It is thus seen that by depressing the treadle 107, the operator starts the necessary cycle of operations by directing the flow of inspection medium across the workpiece. When the piece to be tested has been adequately flooded, the operator removes his foot from the treadle which causes the flow of inspection medium to be directed away from the work and a proper magnetizing current sent through the work for the proper time, the current being automatically disconnected without further action on the part of the operator. In this connection, it will be understood, of course, that instead of operating the push rod 104 through direct connection with the treadle 107, the inlet valve 115 can be connected to a source of compressed fluid so that operation of the treadle or valve means injects a flow of fluid into the cylinder 109 to raise the piston 112, whereupon the flow of fluid into the cylinder is discontinued and the piston and push rod travel back down to their normal position by escape of the fluid through the needle valve 114.

It is important that the inspection medium which is usually in the form of a paste or fluid suspension of iron oxide or other paramagnetic material be kept thoroughly agitated in the sump, and I prefer to accomplish this agitation by providing a by-pass connection 140 from the outlet side of the pump 23 into the lower portion of the sump 16, the by-pass 140 being provided with a header 141 having a plurality of openings therein to jet the liquid into the lower portion of the sump, and keep the mixture thoroughly agitated.

In some instances, it is desirable to have auxiliary means for flooding the workpiece and for this purpose, I provide an auxiliary hose 142 leading from the outlet side of the pump 23 and terminating in a connection and valve 143 so that a manually-operated hose can be attached to the connection 143 for supplemental spraying of the piece.

In some instances it will be desired to operate the baffle plate 103 manually so as to flood the workpiece without initiating the electrical circuit cycle, and as one means of accomplishing this, I provide the arm 102 with an extension 144 which when moved throws the arm 102 out of engagement with the push rod 104. I also provide a valve 145 in the pipe 90 so that the flow of fluid therethrough into the header 91 can be varied or discontinued as desired. In some instances it will be advisable to interconnect the valve 145 and the arm 144 so that closure of the valve will activate the arm 144 and disconnect the baffle assembly from the push rod 104, thus permitting operation thereof without the flow of any fluid through the header and permitting separate operation of the switch mechanism cycle without corresponding operation of the baffle mechanism.

In the form of my apparatus which employs storage batteries, I also provide a battery charger 146 which can be disposed adjacent the pump motor 147 and provided with suitable connections for hooking into an electric circuit. The charger will usually be of the dry plate rectifier type where alternating current is available, and for other installations, a small generator can be connected to the motor 147 to directly charge the battery 46. It will be understood of course that in some installations it will be preferable to connect the rectifier directly into the magnetizing circuit and to use the batteries only as an auxiliary source of power or possibly to eliminate them entirely. Furthermore, in those installations which are provided with a generator, it may be found advisable to draw the magnetizing current directly from the generator which is kept continuously operating during the inspection operation. While the current load is very high, sometimes in the vicinity of 5,000 amperes, still it is only drawn for a very small time, usually a fraction of a second, and consequently a generator can supply this surge of current momentarily without unduly overheating, and likewise, storage batteries or rectifiers can supply the current surge without undue deterioration.

In the preferred form of my invention as illustrated herein, I provide an instrument panel 150 on the front face of the apparatus, and include therein an ammeter 151 in the magnetizing circuit, and a charging ammeter 152 with a charging switch 153 and indicator light 154. If desired, a pump motor switch 155 and indicator light 156 may also be placed on the instrument panel so that all of the major controls are conveniently in one place, except the rheostat 157 and the knife switch toggle handle 127 which are more conveniently located to the left of the instrument panel 150.

It will be understood that while the form of my invention described herein is fully capable of attaining the objects and providing the advantages hereinbefore stated, it is merely illustrative of the present preferred embodiment of my invention, and I do not mean to limit myself to the details shown, but rather intend that my invention be accorded the broad scope defined in the appended claims.

I claim:

1. In apparatus for magnetically inspecting paramagnetic bodies, the combination of: a normally open electric circuit adapted to have a paramagnetic body connected therein as a part of said circuit; means to hold said body in said circuit in position to be inspected; a source of electric energy connected in said circuit; means for continuously conveying an inspection medium past a point above said body to be tested; movable means mounted above said body and below said fluid delivery point adapted in one position to direct the flow of said medium over said entire body; means for moving said movable means to discontinue the flow of said medium over said body; and means responsive to movement of said movable means for closing said circuit to magnetize said body.

2. In apparatus for magnetically inspecting paramagnetic bodies, the combination of: a normally open electric circuit adapted to have a paramagnetic body connected therein as a part of said circuit; means to hold said body in said circuit in position to be inspected; a source of electric energy connected in said circuit; a header disposed above said body and adapted to receive and discharge an inspection medium; a pivoted baffle plate mounted between said header and said body adapted to be swung into operative position to direct the flow of said medium from said header and distribute the same over said body; means for swinging said baffle plate into and out of operative position; and means responsive to said last mentioned means for quickly closing said circuit upon the movement of said baffle plate to a position where said medium is no longer directed over said body.

3. In apparatus for magnetically inspecting paramagnetic bodies, the combination of: a normally open electric circuit adapted to have a paramagnetic body connected therein as a part of said circuit; means to hold said body in said circuit in position to be inspected; a source of electric energy connected in said circuit; a system for circulating an inspection medium including a pump, a header above said body, and a sump to receive said medium and return the same to said pump, whereby said medium is constantly circulated through said system; means movably mounted between said header and said body for causing a flow of said medium over said body or away from the same without interrupting said constant circulation; and means operatively associated with said movable means for closing said circuit while said medium is circulating through said header but not flowing over said body.

4. In apparatus for magnetically inspecting paramagnetic bodies, the combination of: a normally open electric circuit adapted to receive a paramagnetic body therein as a part of said circuit; means to hold said body in said circuit in position to be inspected; a source of electric energy connected to said circuit; means for directing a flow of inspection medium over said body; a movable rod adapted to operate said flow directing means to cause the same to direct said medium over said body when said rod is at one end of its travel; a switch adapted to close said circuit; and means on said rod adapted to close said switch during a portion of the return stroke of said rod and after the flow of said medium over said body has been discontinued as a consequence of the return of said rod; and means for controlling the rate of travel of said rod on its said return stroke to thereby control the time which said circuit is closed.

5. In apparatus for magnetically inspecting paramagnetic bodies, the combination of: a normally open electric circuit adapted to have a paramagnetic body connected therein as a part of said circuit; a source of electric energy connected in said circuit; a spring-loaded headstock having a contact plate connected in said circuit; a movable tailstock carrying a contact plate and adapted to be clamped in position to hold said body between said contact plates, said tailstock carrying a clamp slidable along a bus bar in said circuit and adapted to electrically connect said second contact plate to said bus bar when said tailstock is in clamped position; a header disposed above and to the rear of said stocks provided with an aperture therein; a pump and piping for circulating inspection medium through said header; a pivoted baffle plate beneath said header and adapted to direct the flow of inspection medium therefrom over said body when the same is clamped between said stocks; a vertically movable push rod disposed below said stocks and adapted to operate said baffle through a linkage, said rod being disconnectable from said linkage and having a cam on its mid portion and a piston on its lower portion; said piston being operable in a cylinder having inlet and outlet valves; a switch mechanism having a bell-crank adapted to be operated by said cam to close said switch, with a wiping action between the contacts of said switch, said switch remaining closed until said cam passes said bell-crank; and means for varying the current passing through said circuit.

6. In apparatus for magnetically inspecting paramagnetic bodies, the combination of: a normally open electric circuit adapted to receive a paramagnetic body therein as a part of said circuit; means to hold said body in said circuit in position to be inspected; a source of electric energy connected in said circuit and adapted to energize the same; a movable baffle plate for directing a flow of inspection medium over said body; a movable member adapted to operate said baffle plate to cause the same to direct said medium over said body when said member is at one end of its travel; a switch adapted to close said circuit; and means on said movable member adapted to close said switch during a portion of the return stroke of said member and after the flow of said medium over said body has been discontinued as a consequence of the return of said member.

7. In apparatus for magnetically inspecting paramagnetic bodies, the combination of: a normally open electric circuit adapted to receive a paramagnetic body therein as a part of said circuit; means to hold said body in said circuit in position to be inspected; a source of electric energy connected in said circuit and adapted to energize the same; pivoted means for directing a flow of inspection medium over said body; a movable member adapted to operate said flow directing means to cause the same to direct said medium over said body when said movable member is in one position; a switch adapted to close said circuit; and means on said movable member adapted to close said switch during a portion of the movement of said member and after the flow of said medium over said body has been discontinued as a consequence of the movement of said member.

8. In apparatus for magnetically inspecting paramagnetic bodies, the combination of: means forming a normally open electric circuit adapted to have a paramagnetic body connected therein as a part of said circuit; means to hold said body in said circuit in position to be inspected; a source of electric energy connected in said circuit and adapted to energize the same; a baffle plate movably mounted above said body and adapted when in operative position to direct liquid thereover; means mounted above said baffle plate and adapted to discharge an inspection medium thereon; means for moving said baffle plate into said operative position comprising a vertically movable push rod and a linkage connecting the same to said plate; and switch means adapted to be closed by the return movement of said rod to thereby close said circuit and magnetize said body.

9. In apparatus for magnetically inspecting paramagnetic bodies, the combination of: a normally open electric circuit adapted to have a paramagnetic body connected therein as a part of said circuit; means to hold said body in said circuit in a position to be inspected; a source of electric energy connected in said circuit and adapted to energize the same; movable means for directing a uniform flow of inspection medium over said entire body at once and for discontinuing said entire flow at once; and means operatively associated with said flow directing means and responsive to movement thereof for quickly closing said circuit for a predetermined time upon such discontinuance of said flow.

10. In apparatus for magnetically inspecting paramagnetic bodies, the combination of: a normally open electric circuit adapted to have a paramagnetic body connected therein as a part of said circuit; means to hold said body in said circuit in a position to be inspected; a source of electric energy connected in said circuit and adapted to energize the same; means for directing a uniform flow of inspection medium over said entire body at once and for discontinuing said entire flow at once; switch means for closing said circuit for a predetermined time and then opening the same; and means operatively associated with said flow directing means and said switch means to operate the latter in response to movement of the former.

RAYMOND L. FITCH.

REFERENCES CITED

The following references are of record in the file of this patent:

UNITED STATES PATENTS

| Number | Name | Date |
|---|---|---|
| 2,334,827 | Lyons, Jr. | Nov. 23, 1943 |
| 643,102 | Bates | Feb. 13, 1900 |
| 1,029,541 | Haustetter | June 11, 1912 |
| 2,217,733 | De Forest | Oct. 15, 1940 |
| 2,251,016 | Gallimore | July 29, 1941 |
| 2,277,431 | Fitch | Mar. 24, 1942 |

FOREIGN PATENTS

| Number | Country | Date |
|---|---|---|
| 419,110 | Great Britain | Nov. 6, 1934 |
| 767,653 | France | May 7, 1934 |